Patented May 2, 1933

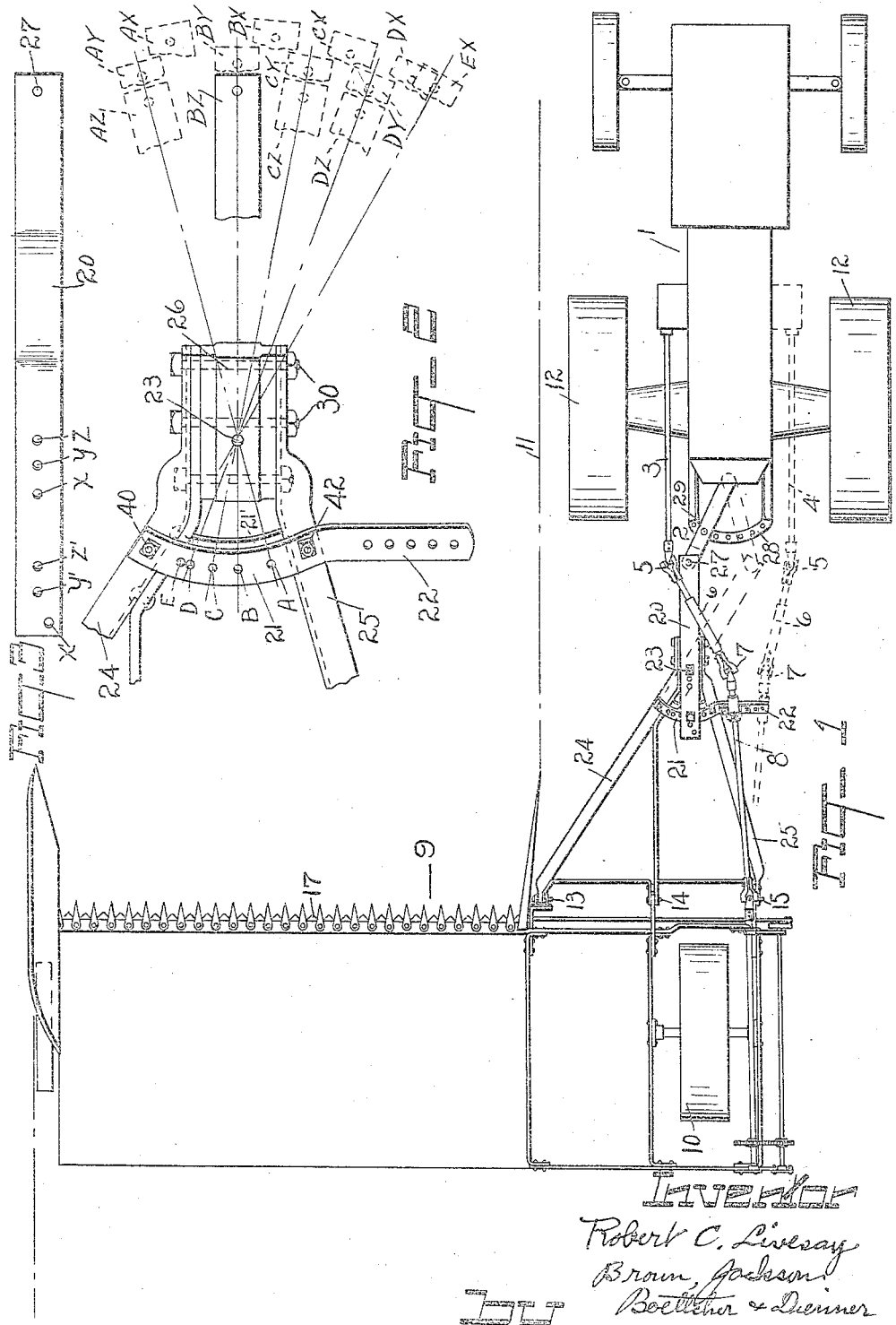

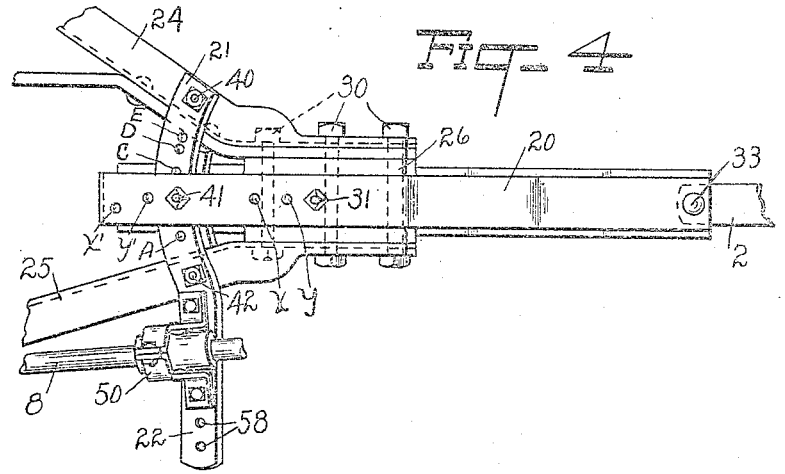
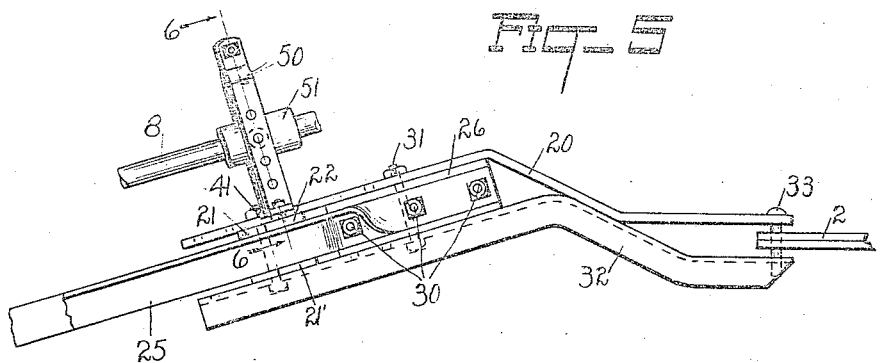
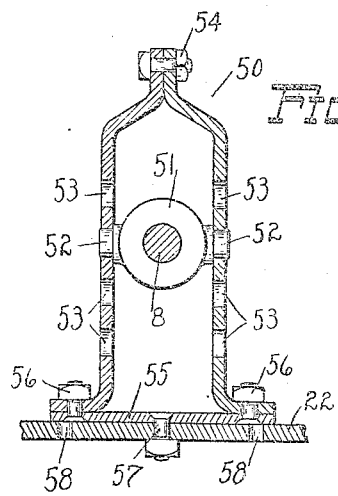

1,906,322

UNITED STATES PATENT OFFICE

ROBERT C. LIVESAY, OF MOLINE, ILLINOIS, ASSIGNOR TO DEERE & COMPANY, OF MOLINE, ILLINOIS, A CORPORATION OF ILLINOIS

DRAFT CONNECTION

Application filed May 23, 1929. Serial No. 365,302.

This invention relates to adjustable stub tongues for attaching a harvesting machine to a tractor, and the principal object of the invention briefly stated is the production of a new and improved adjustable tongue which permits coupling a harvesting machine to any one of a number of different kinds of tractors.

Heretofore manufacturers of farm machinery such as harvesters have not paid particular attention to the provision of adjustable stub tongues which would permit a farmer to couple the haravester onto his tractor if that tractor happened to be the product of some manufacturer other than the maker of his harvester machine.

In other words the manufacturers of these machines have designed draft gear or tongue connections in such a manner that attachment can be made only to their own tractor. Farmers have purchased the harvesting machine without giving thought to how successfully it could be attached to their particular tractor, and in many instances where the tractor was of one manufacture and the harvesting machine of another, it has been necessary for the farmer to go so far as to have a special tongue made so that he could use his harvester with his tractor.

The drawbars of various tractors now on the market are placed at varying heights above the ground and moreover project for different distances to the rear of the driving axle. The stub tongue on the harvesting machine must therefore be adjustable up and down and also forward and aft to permit attaching the machine to these drawbars.

Moreover farm machines such as harvesters do not always rely on the traction of their bull wheels for motive power to run the machine, but rather derive this power from a power take-off on the tractor. Here again the various makers of tractors have not standardized the position of their power take-off either with regard to height above the ground or distance back of the driving axle.

Furthermore, the power take-off on some commercial tractors is on the left hand side of the machine while in other tractors, it is on the right hand side of the machine.

When the tractor and harvester are moving in a straight line, it is necessary that the hitch be so positioned that the telescoping rod will be running approximately in its middle or normal position, so that it will have the desired flexibility to take up the difference in distances between the universal joints when the tractor is being turned in either direction relative to the harvesting machine. Furthermore, it is necessary that the pivot point between the binder and tractor, i. e. the point of connection of the binder tongue with the draw bar of the tractor, be as near directly under the power take-off shaft as possible, in order that turning in one or the other direction will not cause the telescopic connection to be unduly extended or compressed. In some instances where provisions have not been made to permit proper hitching of the harvester to the particular tractor in use, with respect to the normal degree of extension of the telescopic section of the power take-off shaft and the position of the pivot point with respect to the power take-off shaft, the telescoping shaft may be compressed to the point of buckling, or extended to the point of separation when a turn is being made. Therefore, in manufacturing a harvesting machine that is equipped to be pulled and driven by any one of the commercial tractors on the market, I have found it to be desirable to provide an adjustable stub tongue so that the power hitch between the harvester and the tractor can be properly made.

When a harvester is drawn behind a tractor, it is necessary that the wheels of the tractor be run as close as possible to the standing grain so that the sickle of the harvester can be run through the grain without an unduly large side draft.

This necessitates that the stub tongue of the harvester be adjustable laterally so that variations in the width of the tractor can be compensated for. Moreover, it is frequently necessary to employ lugs or cleats on the wheels of the tractor to give it sufficient traction in soft ground, and if the ground is particularly soft, it is necessary to extend these cleats beyond the outer edge of the tractor wheels, thereby necessitating lateral adjustment of the coupling between the tractor and the harvester so that these projecting cleats will not run in the standing grain and tramp it down.

In the case of a rice binder, this lateral adjustment must be rather extensive since the ground on which the rice is grown is maintained under water during the greater part of the season and is therefore soft when the rice is harvested. In order that the tractor may have sufficient traction to pull the rice binder through the field, it is necessary to use long lugs or cleats on the driving wheels of the tractor. Frequently these cleats are as long as 30 inches, and since the wheels of the tractor are but approximately one foot wide, the overhang of the cleat is a matter of several inches and the lateral adjustment of the rice binder tongue must be capable of compensating for increased offset between the tractor and the harvester.

In the present invention I have devised an adjustable stub tongue which meets these requirements by having a plurality of sets of holes which cooperate with the central pivoting hole in the binder tongue and a series of holes in an arcuate plate on the tongue support to adjust the tongue laterally and longitudinally of the binder. I have also provided an adjustable mounting for the main drive shaft of the binder which permits lateral and vertical adjustment of this shaft relative to the binder to bring the universal joints and telescoping shaft in proper position relative to the tractor.

To acquaint those skilled in the art with the teachings of my invention, I have shown a preferred embodiment of it in the accompanying drawings, in which Figure 1 is a plan view of a harvesting machine hitched to a tractor by the adjustable tongue of my invention;

Figure 2 is a plan view of the tongue support of the harvester and a diagrammatic representation of the various positions in which the tongue may be secured;

Figure 3 is a plan view of the tongue itself;

Figure 4 is a plan view of the tongue support of the harvester with the tongue in place and showing also the adjustable drive shaft support of the harvester;

Figure 5 is an elevation view of Figure 4; and

Figure 6 is a cross-sectional view of Figure 5 taken along the line 6—6 looking in the direction of the arrows.

By referring to Figure 1 in more detail, it will be seen that the tractor 1 is equipped with the drawbar 2 which is pivoted to swing through a limited arc and which may be held in any position on that arc by a bolt 29 extending through the drawbar and a corresponding hole in the plate 28. The tractor is also equipped with the power take-off shaft 3 which in this instance is shown as located on the left hand side of the tractor. I have also shown the power take-off 4 located on the right hand side of the tractor to illustrate my arrangement for aligning the power shaft of the binder with the power take-off shaft of the tractor.

The binder 9 is shown as a rice binder comprising the sickle 17 which is supported upon a suitable frame work carried by the wheel 10. The binder is drawn by the draw bar or tongue 20 which is pivoted at 23 to the tongue support members 24 and 25. These tongue support members are pivoted to the main frame of the binder at points 13, 14 and 15 along a horizontal axis which permits limited vertical movement of the tongue support member. The tongue may be adjusted to any one of a number of positions about the pivot point 23, being held in those positions by a bolt extending through the arcuate plate 21. A projection 22 of this plate supports a mounting bracket which holds the power shaft 8 of the binder, which shaft is coupled by the universal joints 5 and 7 and the telescoping shafting 6 to the power take-off shaft 3 of the tractor to thereby transmit power from the tractor to run the binder.

As shown in Figure 1, the outer edge of the tractor wheel 12 is spaced away from the line 11 which represents the standing edge of the grain to be cut by the sickle 17 of the binder. Obviously, this distance between the standing grain and the wheel of the tractor should be as small as possible to reduce the side draft of the binder as much as possible. By suitable adjustment of the drawbar 2 of the tractor and the tongue 20 of the binder, the wheel 12 can be accurately located with respect to the end of the sickle bar; that is, with respect to the edge 11 of the standing grain.

By reference to Figures 2, 3, 4 and 5, it will be seen that the tongue support members 24 and 25 are disposed in an angling position and that they terminate on opposite sides of the pivot support plate 26. The members 24 and 25 are preferably made of angle iron and are attached to the plate 26 by the through bolts 30 extending therethrough.

The arcuate member 21 is attached to the tongue support members 24 and 25 by the bolts 40 and 42. This member being disposed to the rear of the pivot point 23 in the plate 26 serves to support the rear end of the tongue 20. To permit lateral adjustment of the tongue about the pivot point 23, I have provided five holes A, B, C, D and E in the arcuate plate 21, through which holes I project a bolt 41 to attach the rear end of the tongue 20 thereby.

Preferably a second similarly constructed plate 21' is disposed beneath the supporting members 24 and 25 and held thereon by the bolts 40 and 42 in common with the upper plate 21.

The tongue 20 is a rectangular piece of steel formed with an offset and provided with the hole 27 through which the king pin 33 attaches the binder to the drawbar 2 of the tractor. This tongue is also equipped with the holes X, Y and Z through which the bolt 31 projects to pivot the tongue about the point 23 of the plate 26. Three more holes X', Y' and Z' are disposed in the rear end of the tongue and cooperate with the holes A to E, inclusive, of the arcuate plate 21 and the bolt 41 projecting therethrough to fasten the rear end of the tongue on the binder.

It will be obvious that the five holes in the arcuate plate 21 and the three sets of holes in the tongue member 20 allow fifteen different positions in which the tongue may be fastened. In Figure 2 I have illustrated a part of these positions. With the bolt 41 projecting through the hole A and the arcuate plate, and with the bolt 31 projecting through the hole Z and the tongue, the tongue is held in the position A—Z shown in dotted lines in Figure 2. If the bolts 31 and 41 are moved to the respective holes Y, the tongue is extended longitudinally from the binder to the position A—Y shown in the figure.

Similarly if the bolts are moved to the respective holes X in the tongue, the tongue will be moved to the position A—X which, however, is not in line with the other positions just mentioned. It will be noted that the holes X—Y—Z and Y' and Z' are aligned on the center line of the tongue 20 and that the hole X' is offset therefrom. As a result of this arrangement, when the bolt 41 is extended through the hole X', the tongue 20 must be moved in a clockwise direction about the bolt 31 to align the hole X' with the holes A to E in the arcuate plate. This moves the front end of the tongue 20 to the position A—X shown.

Similarly the positions BX, BY and BZ shown in the Figure 2 are those assumed by the tongue when the bolt 41 is projected through the hole B in the arcuate plate and the bolt 31 through the holes X, Y, Z respectively. The positions assumed by the tongue when the bolt 41 is projected through the holes C, D and E are likewise shown in part in Figure 2 for the purpose of illustration.

From the foregoing, it will be apparent that lateral adjustment of the tongue 20 may be made between the positions AY and EX, and that the fore and aft adjustment of the tongue lies between the positions AZ and AX. By this arrangement the lateral relation of the binder to the tractor can be adjusted and the distance between the binder and the tractor can likewise be adjusted. Since the tongue supporting members 24 and 25 are pivoted to the frame of the binder, a vertical adjustment is also possible to compensate for differences in height of the various tractors to which it may be desired to connect the binder.

In addition to the tongue member 20, the binder is equipped with a tongue member 32 which is similarly shaped and provided with holes registering with those of the member 20. The tongue 32 is preferably made of channel iron to give it sufficient strength to withstand the shocks imposed upon the tongue. The member 32 is disposed below the tongue 20 and the supporting plates 24 and 25, being attached to the under face of the plate 26 and to the under arcuate plate 21' by the bolts 41 and 31. It will be seen that this arrangement provides a draft member for coupling the binder to the tractor, and that that member is adjustable laterally and longitudinally to permit maintaining the proper relation between the tractor and the binder.

It will be noted that the lateral movement possible by this adjustment is much greater than is apparently necessary to compensate for different widths of tractors. When a tractor is used in soft ground, such as will be the case when a rice binder is being used to harvest the rice crop, it is necessary to equip the traction wheels 12 of the tractor with lugs or cleats which project outwardly from the wheel in order to give the wheel proper traction with the soft ground. Cleats of this kind are provided in standard lengths of 12, 18, 24 and 30 inches. The wheels 12 of the tractor are usually about 12 inches wide, and obviously when a 12 inch cleat is being used, there is no overhang. However, in the maximum case when the 30 inch cleat is being used on a 12 inch wheel, the overhang is 18 inches and the wheel must, therefore, be spaced at least 18 inches away from the standing grain to prevent the outer ends of the cleats from tramping down the grain.

Actually I have found it advisable to make the maximum possible lateral adjustment slightly more than 18 inches so that with the sickle bar 17 fully imbedded in the standing grain, there will be some clearance between the end of the wheel cleats and the wall of standing grain. For this reason, the stub tongue has been made adjustable through a lateral distance of approximately 20 inches so that even when the long wheel cleats are used, there will be ample clearance between the ends of the cleats and the wall of standing grain. I have found that the longitudinal adjustment of the stub tongue upon its holder need not be proportional to the lateral adjustment of the tongue. This longitudinal adjustment fixes the distance between the power take-off shaft of the tractor and the power shaft of the binder, and the adjustment need to be only sufficient to keep this distance within the range of proper operation of the telescoping shaft connecting the two.

The power take-off shaft of various makes of tractors is located at different places with respect to the king pin of the drawbar. In one tractor, the power take-off is on the left hand side of the machine, in another it is on the right hand side of the machine, and in another it is substantially on the center line of the machine. Moreover, the length of this shaft varies with different makes of tractors so that the universal joint which couples this shaft to the telescoping shaft is located at different positions with respect to the king pin of the drawbar.

For efficient operation of the universal joint in the shafting and the telescoping shaft, the universal joint which connects the power take-off of the tractor to the telescoping shaft should be located as near as possible on the line of the king pin of the drawbar.

To facilitate adjusting the power shaft of the binder so that proper alignment of the shafting may be made, I have provided an extension 22 of the arcuate plate 21 upon which is mounted a support for the main drive shaft 8 of the binder.

As will best be seen in Figures 4, 5 and 6, this support comprises the stirrup straps 50 which are bolted to the base plate 55 by the bolts 56 and bolted together by the bolt 54. Each stirrup strap 50 is perforated with a plurality of holes 53 to which the ears 52 of the shaft bushing 51 fit to vertically align the shaft.

The extension 22 is provided with a plurality of holes 58 to which the bolt 57 may be projected to clamp the base plate 55 on to the bar 22. By this arrangement, lateral adjustment of the shaft 8 is possible through the limits defined by the length of the bracket 22. Vertical adjustment of the shaft 8 is also possible by this arrangement and I have found that the combination of this small vertical and small lateral adjustment of the shaft permits successful operation of the binder when hooked to any one of a number of commercial tractors.

The adjustment of the main drive shaft 8 made possible by this arrangement, also permits proper alignment of the power take-off shafts when the binder is offset from the tractor to compensate for variations in the lengths of wheel cleats used. That is with a given tractor and binder, adjustment of the power shaft and of the lateral location of the binder must be made for each cleat length used. The designs of stub tongue and power shaft adjusting devices have therefore been made with two objects in mind, first to permit proper attachment of the binder to any one of a number of tractors, and second to permit proper attachment of the binder in any one of several positions behind a tractor, and to properly align the power shaft in either case.

While I have chosen to illustrate a preferred embodiment of my invention in the form of an adjustable stub tongue for a rice binder, I have done so by way of example only as the invention is limited neither to the particular form of machine shown nor to the particular embodiment illustrated. I am aware that there are many modifications and adaptations which can be made by one skilled in the art and I am not therefore to be limited to the specific disclosure shown.

Having thus complied with the statutes and shown and described a preferred embodiment of my invention, what I consider new and desire to have protected by Letters Patent is pointed out in the appended claims.

What is claimed is:

1. An adjustable draft coupling for attaching a harvesting machine to a tractor comprising, a support pivotally attached to the harvesting machine for vertical motion with respect thereto, a mounting plate attached to said support and having a single hole perforated in it, an arcuate plate attached to said support rigidly with respect to said plate and having a plurality of holes, a stub tongue having a plurality of sets of holes, said tongue being bolted to said support by a bolt extending through one of the holes of one of the sets in said tongue and through said mounting plate hole, and by a second bolt extending through the other hole of the set in the tongue and any one of said plurality of holes in said arcuate plate, said arcuate plate being in the same plane with said mounting plate.

2. An adjustable draft coupling for attaching a harvesting machine to a tractor comprising, a tongue support pivoted to the harvester and capable of vertical motion with respect thereto, a tongue attached to said support and capable of both longitudinal and lateral adjustment with respect to the support, and a power shaft hanger mounted on said support and capable of both lateral and vertical adjustment thereon.

3. An adjustable draft coupling for attaching a harvesting machine to a tractor comprising, a tongue support pivoted to the harvester and capable of vertical motion with respect thereto, a tongue perforated with a plurality of sets of holes, there being two holes in each set, an arcuate plate on said support perforated with a plurality of holes, a mounting plate containing a single hole, said single hole and one of the holes in the tongue being brought into registration to fix the longitudinal relation of said tongue and support, and the other hole of the set in the tongue being brought into registration with one of the holes in said arcuate plate to fix the lateral adjustment of the tongue with respect to the support.

4. In a harvesting machine having a frame, a pair of angle bars forming a V-shaped projection extending from said frame, a mounting plate disposed in the closed end of said V and bolted to said bars, said plate having a single hole through it at right angles to the plane of said V projection, an arcuate plate attached to said projection adjacent to said mounting plate, said arcuate plate containing a plurality of holes disposed between said angle bars, a stub tongue comprising a bar of rectangular cross-section and a bar of channel cross-section, said bars containing a plurality of sets or holes disposed with the holes in one bar registering with the holes in the other bar, said stub tongue being attached to said projection by a bolt extending through a hole in one of the sets of said bars and through the hole in said mounting plate, and by a second bolt extending through the corresponding hole of the set in the tongue bars and through one of the holes in the arcuate plate registering therewith.

5. In a harvesting machine having a frame, a pair of angle bars forming a V-shaped projection extending from said frame, a mounting plate disposed in the closed end of said V and bolted to said angle bars, said plate having a single hole through it at right angles to the plane of said V-shaped projection, an arcuate plate attached to said projection adjacent to said mounting plate, said arcuate plate containing a plurality of holes disposed between said angle bars, and having a portion containing a certain plurality of holes and extending beyond said angle bars, a stub tongue comprising a bar of rectangular cross-section and a bar of channel cross-section, each bar containing a plurality of sets of holes disposed with the holes in one bar registering with the holes in the other bar, said stub tongue being attached to said projection by a bolt extending through a hole in one of the sets of said bars and through the hole in said mounting plate, and by a second bolt extending through the corresponding hole of the set in the tongue bars and through one of the holes in the arcuate plate registering therewith, a bearing support mounted on the extension of said arcuate plate by a bolt extending through one of said fixed plurality of holes, two stirrup brackets bolted to said support, said brackets containing a plurality of holes each aligned with a hole in the other bracket, and a bearing supported in said stirrup brackets by ears which project into said holes.

6. An adjustable draft coupling for attaching a harvesting machine to a tractor comprising, a tongue support pivoted to the harvester and capable of vertical motion with respect thereto, a tongue attached to said support and capable of both longitudinal and lateral adjustment with respect to the support, and means for locking said tongue with respect to the support after said adjustments are made.

7. An adjustable draft coupling for attaching a harvesting machine having a power shaft to a tractor having a power take-off comprising a tongue support on the harvester, a draft tongue attached to said support, and means for adjusting the tongue longitudinally and laterally with respect to said support to bring the said power shaft in juxtaposition to said power take-off, said tongue support being pivotally connected to the harvester for vertical movement relative thereto.

8. An adjustable draft coupling for attaching a harvester that is provided with a power shaft to the adjustable draw bar of a tractor that is equipped with a power take-off comprising, means for coupling said power shaft to said power take-off, a tongue support attached to said harvester, a draft tongue mounted on said support, and means for adjusting said tongue with respect to said support to bring said coupling means in close proximity to said draw bar, said power shaft being mounted on said tongue support and being capable of relative vertical and lateral adjustments thereon.

9. A coupling for attaching a harvester that is provided with a power shaft to a tractor that is provided with a power take-off and with a laterally adjustable draw bar comprising, a telescoping shaft and universal joints for connecting said power shaft to said power take-off, and a tongue on said harvester, which is adapted to be pivotally attached to said draw bar and which is adjustable laterally and longitudinally on the harvester to bring the pivot point between the draw bar and tongue approximately in the plane of the power take-off.

10. A power shaft bearing support for harvesters comprising, a bearing, ears diametrically disposed on said bearing, a pair of stirrup straps each having a plurality of holes into which said ears project, a base plate, and means for attaching said stirrup straps to said base plate.

11. A power shaft bearing support for harvesters comprising, a bearing, ears diametrically disposed on said bearing, a pair of stirrup straps each having a plurality of holes into pairs of which said ears are projected to adjust the bearing vertically, a base plate and means for attaching said stirrup straps to said base plate.

12. A power shaft bearing support for harvesters comprising, a bearing, ears diametrically disposed on said bearing, a pair of stirrup straps each having a plurality of holes into which said ears project, a base plate, and means for attaching said stirrup straps to said base plate, and a bracket having a plurality of holes, and means for adjustably attaching said base plate to said bracket to adjust said bearing laterally.

13. An adjustable coupling for attaching a harvester to a tractor, comprising a mounting plate pivotally connected to the harvester for vertical movement relative thereto and having a single hole, an arcuate plate in the same plane with said mounting plate and having a plurality of holes, and a stub tongue having a plurality of sets of holes, one of the holes in each set registering with said single hole and the other of the holes of the sets registering with any one of said plurality of holes to adjust the tongue longitudinally and laterally with respect to the mounting plate.

14. In an adjustable coupling for attaching a harvester to a tractor, the combination of a stub tongue having a plurality of sets of holes, a mounting plate rigidly mounted on forwardly extending bars pivoted to the harvester, said pivotal connection permitting vertical movement of the mounting plate with respect to the harvester, an arcuate plate mounted on said bars in the same plane with said mounting plate and having a plurality of holes, said mounting plate having a single hole for receiving a bolt that extends through one of the holes of one of said sets of the tongue, said arcuate plate having a plurality of holes for receiving a bolt that extends through the other hole of the set through which said first bolt extends and having an extension, and a power shaft bearing adjustably mounted on said arcuate plate extension for vertical and lateral adjustments relative thereto.

15. An adjustable draft coupling for attaching an agriculture machine to a tractor, there being power shaft connections between the machine and tractor, said coupling comprising a tongue support, and a tongue attached to said support and capable of both longitudinal and lateral adjustments with respect to said support, and a shiftable support for said power shaft whereby the latter may be adjustably positioned in accordance with the position of said adjustable tongue.

16. An adjustable draft coupling for attaching a farm implement to a tractor, there being a power take-off shaft connection between the tractor and implement, said coupling comprising a tongue support movably connected with the implement, a tongue connected with said support and capable of longitudinal and lateral adjustments relative thereto, and means shiftably connected with said support for adjustment in a lateral direction and adapted to support at least a portion of said power connections in adjusted position adjacent the lateral adjusted position of one end of said tongue.

17. A coupling for attaching a farm implement having a power shaft to a tractor having a power take-off and a laterally adjustable draw bar comprising, means including a universal connection for coupling said power shaft to said power take-off, a support pivoted to the implement for vertical movement relative thereto, a draft tongue mounted on said support for lateral and longitudinal adjustments relative thereto, and a king pin for pivotally attaching said draft tongue to said draw bar, said power take-off shaft lying in close proximity to a vertical line through said king pin, and said universal connection intersecting a vertical plane extended through said king pin at right angles to the axis of said tractor.

18. In an adjustable coupling for attaching a harvester to a tractor, the combination of a stub tongue comprising substantially parallel bars each having a plurality of sets of holes, a mounting plate carried by the harvester and having substantially parallel faces, a pair of arcuate plates mounted in the same planes as the faces of said mounting plate and having a plurality of holes, said mounting plate having a single hole for receiving a bolt that extends through one of the holes of one of said sets of the tongue, said arcuate plates each having a plurality of holes for receiving a bolt that extends through the other hole of the set through which said first hole extends, an extension on one of said arcuate plates, and a power shaft bearing adjustably mounted on said arcuate plate extension for lateral adjustments relative thereto.

19. A coupling for attaching a farm implement having a power shaft to a tractor having a power take-off and a laterally adjustable draw bar, said coupling comprising means including a universal connection for coupling said power shaft with said power take-off, a support connected with the implement, a draft tongue mounted on said support for lateral and longitudinal adjustments relative thereto, and pivot means for pivotally attaching said draft tongue to said draw bar, said power take-off shaft being located above said pivot pin and lying in close proximity to a vertical line extended through the pivot pin, and said universal connection intersecting a vertical plane passed through the axis of said pivot means at right angles to the axis of said tractor.

In witness whereof, I hereunto subscribe my name this 15th day of May, 1929.

ROBERT C. LIVESAY.

CERTIFICATE OF CORRECTION.

Patent No. 1,906,322.　　　　　　　　　　　　　　　　　　　　May 2, 1933.

ROBERT C. LIVESAY.

It is hereby certified that error appears in the printed specification of the above numbered patent requiring correction as follows: Page 5, line 14, claim 4, for "or" read "of"; and line 101, claim 9, before "tongue" insert the word "draft"; and that the said Letters Patent should be read with these corrections therein that the same may conform to the record of the case in the Patent Office.

Signed and sealed this 6th day of June, A. D. 1933.

M. J. Moore.

(Seal)　　　　　　　　　　　　　　　　　　　　Acting Commissioner of Patents.